United States Patent [19]

Karol et al.

[11] Patent Number: 5,637,251
[45] Date of Patent: Jun. 10, 1997

[54] FUNCTIONAL ADDITIVE COMPOSITION BASED ON ORGANIC AMINE SALTS FOR COOLANTS

[75] Inventors: Thomas J. Karol, Norwalk; Steven G. Donnelly, New Fairfield, both of Conn.

[73] Assignee: R.T. Vanderbilt Company, Inc., Norwalk, Conn.

[21] Appl. No.: 509,266

[22] Filed: Jul. 31, 1995

[51] Int. Cl.$^6$ .............................. C09K 5/00; F28F 23/02; C23F 11/00; C23F 11/10
[52] U.S. Cl. ........................... 252/77; 252/75; 252/392; 508/273
[58] Field of Search .................. 564/509; 562/493; 252/75, 77, 392; 508/273, 525, 583

[56] References Cited

U.S. PATENT DOCUMENTS

| | | | |
|---|---|---|---|
| 2,910,439 | 10/1959 | Fields | 252/46.7 |
| 3,966,623 | 6/1976 | Krug et al. | 252/47 |
| 4,219,433 | 8/1980 | Manabe et al. | 252/75 |
| 4,233,176 | 11/1980 | Conner, Sr. | 252/392 |
| 5,085,793 | 2/1992 | Burns et al. | 252/79 |
| 5,368,758 | 11/1994 | Gapinski | 252/42.7 |

FOREIGN PATENT DOCUMENTS 1560830   2/1980   United Kingdom.

Primary Examiner—Douglas J. McGinty
Assistant Examiner—Charles Boyer
Attorney, Agent, or Firm—Rasma B. Balodis

[57] ABSTRACT

This invention relates to a water-based antifreeze or coolant composition having improved antioxidant and anticorrosion properties and comprising a major amount of an aqueous solution of a polyhydric alcohol and a minor amount of a functional additive composition consisting of monoallylamine salt of 2,5-dimercapto-1,3,4-thiadiazole and monoallylamine salt of benzoic acid.

3 Claims, No Drawings

FUNCTIONAL ADDITIVE COMPOSITION BASED ON ORGANIC AMINE SALTS FOR COOLANTS

BACKGROUND OF THE INVENTION

The present invention concerns coolant and antifreeze compositions for use in the cooling systems of internal combustion engines. More particularly, the invention relates to additive compositions for improving the properties of antifreeze and coolant compositions.

In general, water-based cooling compositions are employed for cooling internal engines. The coolants contain alcohols and glycols as antifreeze agents. The compositions can be oxidized to acidic materials by contact with air at operating temperatures and corrode metal parts of the cooling system of the engine.

It is a known practice to include in antifreeze and coolant composition additives that are designed to inhibit corrosion of the various metals which are present in cooling systems. These additives are known as corrosion inhibitors or metal deactivators. Antioxidants are added to prevent oxidation of the composition and subsequent sludge formation.

Prior art antifreeze and coolant compositions have contained as corrosion inhibitors aromatic carboxylic acid, e.g. benzoic acid as disclosed in U.S. Pat. No. 5,085,793. Another antifreeze and coolant composition is disclosed in U.S. Pat. No. 4,219,433 which teaches corrosion inhibition by addition of benzoic acid, trialkanolamine, organic phosphate and benzothiazole or benzotriazole compounds.

Another application for corrosion inhibitors is their use in lubricating compositions. U.S. Pat. No. 3,966,623 teaches a synergistic corrosion inhibiting composition of 2,5-bis-(alkenyldithio)-1,3,4-thiadiazole and aliphatic amine salt of 2-mercaptobenzothiazole. U.S. Pat. No. 4,233,176 discloses a silver corrosion inhibitor composition based on lubricating oil and containing monobasic acid, aminoalkylalkanolamine, an organic amine compound and benzoic acid. British Pat. No. 1,566,830 discloses primary and secondary amine derivatives of 2,5-dimercapto-1,3,4-thiadiazole said to possess antiwear and corrosion properties.

The above cited prior art shows the use of thiadiazole compounds as corrosion inhibitors for lubricating oils. The present invention is not directed to imparting anticorrosion properties to lubricating compositions affording corrosion protection to the lubricated parts of the engine. The invention is directed to cooling and antifreeze compositions and to the corrosion protection of cooling systems coming into contact with said compositions.

Surprisingly, it has been discovered that particular compositions based on monoallylamine derivative of 2,5-dimercapto-1,3,4-thiadiazole and of benzoic acid display improved metal corrosion inhibiting effect when incorporated into cooling or antifreeze compositions. In addition, the compositions stabilize the antifreeze compositions against oxidative degradation and further enhance the properties of said compositions.

SUMMARY OF THE INVENTION

According to the invention, there are provided multifunctional additive compositions for antifreeze or coolant compositions consisting of (a) monoallylamine salt of 2,5-dimercapto-1,3,4-thiadiazole and (b) monoallylamine salt of benzoic acid and wherein the mole ratio of the thiadiazole to the acid ranges from 1:1 or 2:3.

Another aspect of the invention concerns improved antifreeze and coolant compositions comprising a major portion of polyhydric alcohol and about 0.01 to 5.0 percent of a composition consisting of monoallylamine salt of 2,5-dimercapto-1,3,4-thiadiazole and monoallylamine salt of benzoic acid in the mole ratio of the thiadiazole to the acid ranging from about 1:1 to 2:3.

The invention further provides a method for inhibition of metal corrosion in cooling systems which utilize polyhydric alcohol based coolants by adding to said coolant the above described additive composition.

DETAILED DESCRIPTION OF THE INVENTION

The monoallylamine salt of 2,5-dimercapto-1,3,4-thiadiazole component is prepared in a known manner by reacting 2,5-dimercapto-1,3,4-thiadiazole with monoallylamine in a molar ratio of 1:1 thiadiazole to amine at 80° to 100° C. The reaction may be conducted in an inert organic solvent.

Similarly, the other component of the additive, monoallylamine salt of benzoic acid, is prepared by reacting monoallylamine with benzoic acid by heating at 80° to 100° C. For this application, both monoallylamine derivatives can be prepared in the same reaction vessel by charging 2,5-dimercapto-1,3,4-thiadiazole, benzoic acid and equimolar amounts of monoallylamine to form a monoallylamine salt mixture. The 2,5-dimercapto-1,3,4-thiadiazole being the strongest acid forms a mono salt of the amine and then the remainder of the amine forms a salt with the benzoic acid.

Unexpectedly, mixed allylamines of 2,5-dimercapto-1,3,4-thiadiazole (DMTD) and of benzoic acid produce an improved corrosion inhibiting effect when combined in certain ratios. A particularly preferred mole ratio is 1:1 to 2:3 of the thiadiazole to the acid.

Another advantage of the combination is that the compositions possess good antioxidant properties and enhance the overall performance of the coolant.

The additive compositions may be incorporated in any coolant or antifreeze media by known methods. The compositions impart metal deactivating as well as oxidation inhibiting properties to coolants and antifreeze compositions. The improved additive compositions are particularly effective in inhibiting the corrosion of copper and iron present in the metal parts of cooling systems. An added advantage is that the corrosion inhibiting composition does not significantly affect the pH of the coolant system. The pH remains in the range of 8.5 to 10.5. This range is desirable because of the relative passivity of ferrous metals in that pH range.

The coolants are based on water-soluble polyhydric alcohol media. Typical coolants are based on glycols, in particular ethylene glycol, diethylene glycol, propylene glycol, dipropylene glycol, triethylene glycol or their mixtures.

The compositions of the invention may be incorporated in the antifreeze or coolant compositions in an amount effective to produce the desired corrosion inhibiting characteristics. Typically, the amount ranges from about 0.01 to 5.0 percent by weight based on the total weight of the antifreeze or coolant composition. The preferred range is about 0.1 to 1.0 percent of the additive based on the total weight of the antifreeze or coolant composition.

The antifreeze or coolant compositions may contain other ingredients necessary to enhance their functional properties. Such ingredients include antifoaming agents, pH buffers, scale inhibitors to eliminate hard water deposits, auxiliary corrosion inhibitors to protect corrosion of aluminum, silicate-type stabilizers, biocides and colorants.

The following examples are given for the purpose of further illustrating the invention. All percentages and parts are based on weight unless otherwise indicated.

EXAMPLE I

Test specimens were prepared by adding the additive compositions of the invention to a fully formulated, ethylene glycol-based antifreeze composition in the amount given in Table 1. Specimen 1 contained no additive and served as control. The antifreeze base was composed of 50 volume percent ethylene glycol and 50 volume percent water and contained a standard additive package with the exception of an antioxidant/metal inhibitor.

The specimens were tested according to a modified ASTM D2272 test method. The test was conducted for 380 min. at 101° C. and 90 psi oxygen in the presence of a copper coil catalyst.

Specimens 2, 3 and 4 containing additives of the invention showed good pH stability and reduced sludge formation as evidenced by the measured oxidation byproducts, formic acid, glycolic acid and copper content. Reserve alkalinity (RA) is measured as ml of 0.1N HCl required to adjust the antifreeze to pH of 5.5.

The above embodiments have shown various aspects of the present invention. Other variations will be evident to those skilled in the art and such modifications are intended to be within the scope of the invention as defined by the appended claims.

TABLE 1

| Additive Ingredients | Composition, ppm | | | |
|---|---|---|---|---|
| | 1 | 2 | 3 | 4 |
| Allylamine DMTD - Allylamine Benzoic Acid (1:1 mole ratio) | — | 1,000 | — | — |
| Allylamine DMTD - Allylamine Benzoic Acid (2:3 mole ratio) | — | — | 1,000 | 1,500 |
| Physical Properties | | | | |
| pH, initial | 10.79 | 10.22 | 10.11 | 9.85 |
| pH, final | 7.74 | 10.15 | 10.06 | 8.64 |
| RA, ml, initial | 5.0 | 5.0 | 5.0 | 5.0 |
| RA, ml, final | 2.0 | 3.3 | 3.2 | 3.6 |
| Conductance, initial | 1548 | 1525 | 1510 | 1630 |
| Conductance, final | 1612 | 1612 | 1640 | 1575 |
| Formic acid, ppm | 130.0 | 27.0 | 25.0 | 0.0 |
| Glycolic acid, ppm | 1420.0 | 280.0 | 250.0 | 0.0 |
| Cu, ppm | 2.6 | 0.6 | 0.0 | 0.1 |

What is claimed is:

1. A water-based antifreeze or coolant composition having improved antioxidant and anticorrosion properties and comprising a major amount of an aqueous solution of a polyhydric alcohol and about 0.01 to 5.0 percent of a functional additive composition consisting of monoallylamine salt of 2,5-dimercapto-1,3,4-thiadiazole and monoallylamine salt of benzoic acid in the mole ratio of the thiadiazole to the acid ranging from about 1:1 to 2:3.

2. An antifreeze or coolant composition according to claim 1 wherein the polyhydric alcohol is selected from the group consisting of ethylene glycol, diethylene glycol, propylene glycol, dipropylene glycol, triethylene glycol or their mixtures.

3. A method for protecting engine coolant parts from corrosion which comprises contacting their surfaces with a cooling or antifreeze composition comprising a major amount of an aqueous solution of a polyhydric alcohol and about 0.01 to 5.0 percent of a functional additive composition consisting of monoallylamine salt of 2,5-dimercapto-1,3,4-thiadiazole and monoallylamine salt of benzoic acid in the mole ratio of the thiadiazole to the acid ranging from about 1:1 to 2:3.

* * * * *